(12) United States Patent
Iwakami

(10) Patent No.: US 8,534,921 B2
(45) Date of Patent: Sep. 17, 2013

(54) MARINE DRIVE SHAFT-BEARING STRUCTURE

(75) Inventor: Hiroshi Iwakami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1188 days.

(21) Appl. No.: 11/724,199

(22) Filed: Mar. 15, 2007

(65) Prior Publication Data

US 2007/0230848 A1  Oct. 4, 2007

(30) Foreign Application Priority Data

Mar. 17, 2006  (JP) ................................. 2006-074549

(51) Int. Cl.
*F16C 33/66* (2006.01)
*F16C 19/00* (2006.01)

(52) U.S. Cl.
USPC .......................................... 384/474; 384/473

(58) Field of Classification Search
USPC ................ 220/666; 215/900; 285/205–208, 285/213, 219, 221, 390, 355, 386, 247; 384/462, 471, 473, 474; 403/299; 138/109
See application file for complete search history.

(56) References Cited

U.S. PATENT DOCUMENTS

| 1,520,705 | A | * | 12/1924 | Farmer | 285/64 |
| 2,071,929 | A | * | 2/1937 | Harter | 184/103.1 |
| 4,513,704 | A | * | 4/1985 | Evans | 123/196 S |
| 4,909,205 | A | * | 3/1990 | Bewley, III | 123/196 S |
| 6,125,969 | A | * | 10/2000 | Graf et al. | 184/105.1 |
| 6,354,816 | B1 | * | 3/2002 | Yang | 417/411 |
| 7,059,450 | B2 | * | 6/2006 | O'Toole et al. | 184/105.1 |

FOREIGN PATENT DOCUMENTS

| JP | 8-334198 A | 12/1996 |
| JP | 9-236198 A | 9/1997 |
| JP | 2003-89399 A | 3/2003 |

* cited by examiner

*Primary Examiner* — Alan Waits
(74) *Attorney, Agent, or Firm* — Birch, Stewart, Kolasch & Birch, LLP

(57) ABSTRACT

To provide a marine drive shaft-bearing structure capable of simply filling grease without an effort and at a reduced cost. A marine drive shaft-bearing structure includes a bearing body disposed between an engine and an impeller for propulsion. Front and rear bearing members are received in a bearing chamber within the bearing body so as to rotatably support a drive shaft which connects the engine with the impeller. A grease filling portion is adapted to fill grease into the bearing chamber. The grease filling portion includes a grease filling port formed in the bearing body so as to communicate with the bearing chamber and a grease tank for storing the grease and for being detachably attached to the grease filling port.

20 Claims, 8 Drawing Sheets

MARINE DRIVE SHAFT-BEARING STRUCTURE

CROSS-REFERENCE TO RELATED APPLICATIONS

The present application claims priority under 35 USC 119 to Japanese Patent Application No. 2006-074549 filed on Mar. 1, 2006 the entire contents of which are hereby incorporated by reference.

BACKGROUND OF THE INVENTION

1. Field of the Invention

The present invention relates to a marine drive shaft-bearing structure in which a bearing member is received in a bearing chamber within a bearing body, a drive shaft is rotatably supported by the bearing member, and a grease filling portion is provided to provide grease to the bearing chamber.

2. Description of Background Art

Marine drive shaft-bearing structures are known wherein a bearing body is provided between an engine and an impeller. A drive shaft for the impeller is rotatably supported by the bearing body via bearing members (ball bearings) with sealing members being provided at both ends of the bearing body to define a bearing chamber for sealing the bearing member. A grease filling portion is provided to provide grease to the bearing chamber and a breather portion is provided to absorb the expansion of the grease or air in the bearing chamber. See, e.g., Japanese Patent Laid-open No. 2003-89399.

In addition, the drive shaft for the impeller is adapted to connect the output shaft of the engine to the impeller shaft for a water jet pump. The rotation of the engine is transmitted by this drive shaft to an impeller shaft to rotate an impeller.

The rotation of the impeller drives the water jet pump for providing propulsion to the watercraft.

The grease filling portion of the Japanese Patent Laid-open No. 2003-89399 is configured as set forth below. A grease filling port is formed in the bearing body to communicate with the bearing chamber. A connection tube is attached to the grease filling port and communicates with a grease supply hose. A grease nipple attached to the end of the grease supply hose is attached to the upper portion of a watercraft body.

In addition, because the connection tube is attached to the grease filling port of the bearing body, it is disposed in the vicinity of the bottom portion of the watercraft body. Further, the grease nipple is attached to the upper portion of the watercraft body.

Thus, since the distance between the connection tube and the grease nipple is relatively large, the grease supply hose used to connect the connection tube with the grease nipple is relatively long.

When grease is filled in the bearing chamber of the bearing body using the grease filling portion, a grease gun (grease injector) is used to inject the grease from the grease nipple. The grease thus injected is filled in the bearing chamber through the grease supply hose, the connection tube and the grease filling port.

However, the grease filling portion set forth in Japanese Patent Laid-open No. 2003-89399 requires a grease gun because grease is injected from the grease nipple and the grease is likely to adhere to the vicinity of the grease nipple.

If the grease adheres to the vicinity of the grease nipple, wiping off the adhering grease involves an effort. Therefore, there is a need for practical use of a technique that can simply fill grease into a bearing chamber without use of a grease gun and without any effort.

On the other hand, in the grease filling portion, the grease supply hose having a relatively large length is connected to the connection tube and the grease nipple is attached to the end of the grease supply hose. Therefore, the number of component parts is increased and the cost of the grease supply hose is increased. This makes it difficult to suppress the cost.

SUMMARY AND OBJECTS OF THE INVENTION

It is an object of an embodiment of the present invention to provide a marine drive shaft-bearing structure that can easily fill grease without an effort and at a reduced cost.

According to an embodiment of the present invention, a marine drive shaft-bearing structure includes a bearing body disposed between an engine and an impeller with a bearing member received in a bearing chamber within the bearing body so as to rotatably support a drive shaft for connecting the engine with the impeller. The bearing shaft is sealed between the drive shaft and the bearing body with a grease filling portion which is adapted to fill grease into the bearing chamber and which includes a grease filling port formed in the bearing body so as to communicate with the bearing chamber and a grease tank storing the grease therein that is detachably attached to the grease filling port.

According to an embodiment of the present invention, the grease tank is formed with a threaded portion that is threadedly connected to the grease filling port.

According to an embodiment of the present invention, the grease tank is formed of an elastic material so as to deflate according to a reduction of the grease stored in the inside thereof.

According to an embodiment of the present invention, the grease filling port is formed in the bearing body and the grease tank is detachably attached to the grease filing port. In this way, the grease stored in the grease tank is filled (replenished) into the bearing chamber.

Consequently, it is possible to keep the grease tank attached to the grease filling port. This eliminates the use of a grease gun and further the possibility that grease will adheres to the vicinity of the grease filling port.

Thus, since it is not necessary to wipe off the grease adhering to the vicinity of the grease filling port, there is an advantage that grease can be easily filled (replenished) without an effort Further, according to an embodiment of the present invention, a simple configuration can be provided in which the grease tank is only attached to the grease filling port.

This makes it possible to reduce the number of component parts and further to use a simply configured grease tank. Therefore, the cost of the grease filling port can be reduced advantageously.

According to an embodiment of the present invention, the grease tank is provided with the threaded portion and the threaded portion is used to threadedly connect the grease tank to the grease filling port.

Consequently, for instance, when the grease in the grease tank is used up, it is possible to easily replace the grease tank with a new grease tank storing grease therein by removing it from the grease filling port. This provides an advantage of enhancing the usability of the grease tank.

According to an embodiment of the present invention, the grease tank is made to deflate according to a reduction of the grease.

This makes it possible to satisfactorily draw the grease in the grease tank to the outside thereof. There is an advantage therefore that the grease in the grease tank can be smoothly filled in the bearing chamber.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the present invention will be hereinafter described with reference to the accompanying drawings. Note that "the front," "the rear or back," "the left" and "the right" are based on the direction the operator faces and the front side, the rear or back side, the left side and the right are denoted by symbols "Fr," "Rr," "L" and "R", respectively.

Figure 1:
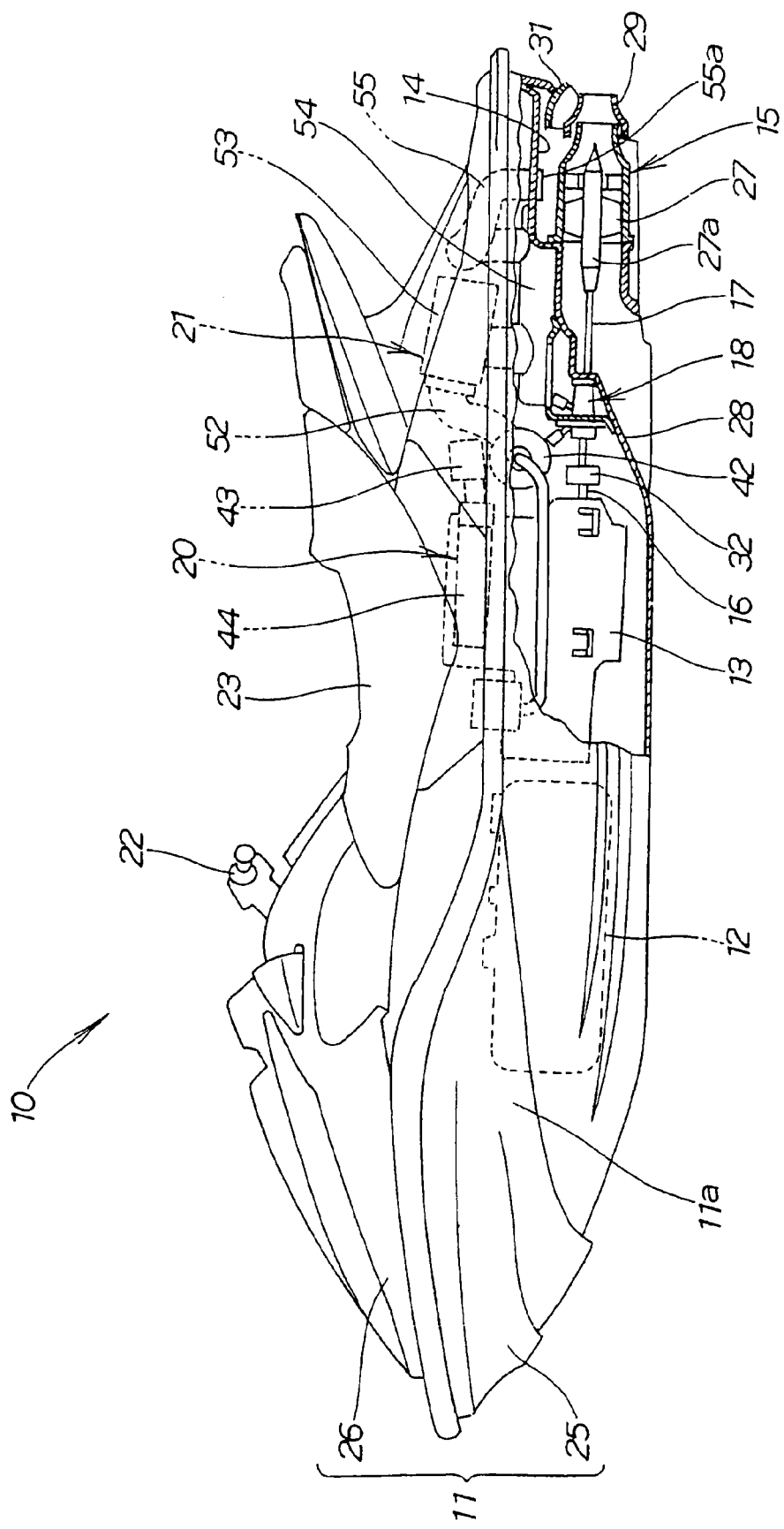
FIG. 1 is a side view of a personal watercraft provided with a marine drive shaft-bearing structure (a first embodiment) according to the present invention.

FIG. 1 is a side view of a personal watercraft provided with a marine drive shaft-bearing structure (first embodiment) according to the present invention.

The personal watercraft 10 is a water jet propulsion boat that includes a fuel tank 12 in the front portion 11a of a watercraft body 11, an engine 13 rearward of the fuel tank 12, a pump chamber 14 rearward of the engine 13, and a water jet pump 15 in the pump chamber 14. In addition, it includes a drive shaft 17 for connecting the water jet pump 15 with an output shaft 16 of the engine 13, and a bearing structure (marine drive shaft-bearing structure) rotatably supporting the drive shaft 17. An air intake structure 20 is provided for supplying air to the engine 13 with an exhaust structure 21 for discharging exhaust gas from the engine 13, a steering handlebar 22 above the fuel tank 12 and a seat 23 rearward of the steering handlebar 22.

The watercraft body 11 is configured such that a hull 25 constituting the lower portion of the watercraft body 11 is covered by and joined to a deck 26 constituting the upper portion of the watercraft body 11.

With the small watercraft 10, the engine 13 is driven to rotate the drive shaft 17, thereby rotating an impeller 27 for propulsion, which is built in the water-jet pump 15.

Rotating the impeller 27 takes in water from a suction opening 28 of the bottom of the watercraft and the water taken in is jetted rearward of the watercraft body 11 from a steering nozzle 29 through the inside of the water-jet pump 15.

Thus, the watercraft 10 is propelled (glides) forwardly.

On the other hand, when the watercraft 10 is made to move rearward, a reverse bucket 31 disposed above the steering nozzle 29 is shifted to a reverse position located rearward of the steering nozzle 29.

Thus, the water jetted rearward from the steering nozzle 29 is led to the front of the watercraft body 11, whereby the jetted water thus led moves the watercraft 10 backward.

Figure 2:
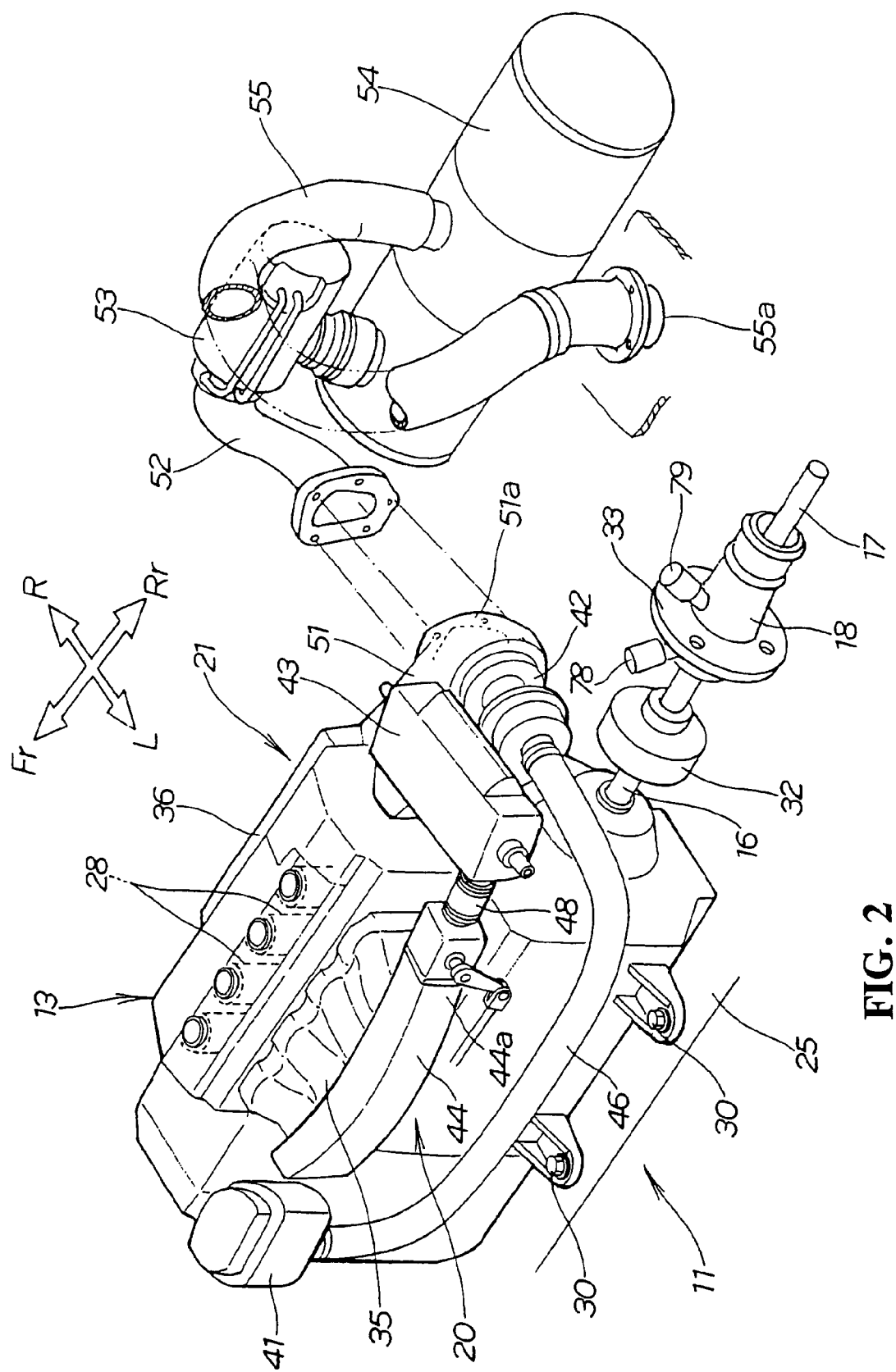
FIG. 2 is a perspective view illustrating the inside of the personal watercraft provide with the marine drive shaft-bearing structure according to the first embodiment.

FIG. 2 is a perspective view illustrating the inside of the personal watercraft provided with the marine drive shaft-bearing structure according to the first embodiment.

The engine 13 includes a plurality of cylinders 28 arranged in the back-and-forth direction of the watercraft body 11 and left-hand and right-hand mount portions fastened to the hull 25 with bolts 30. In short, the engine 13 is longitudinally mounted on the watercraft body 11.

The output shaft 16 projects from the rear lower end of the engine 13 toward the back of the watercraft body 11. The drive shaft 17 is coupled to the output shaft 16 via a connection coupler 32.

The drive shaft 17 is rotatably supported by the bearing structure 18 and is coupled at its rear end to the rotational shaft 27a of the impeller 27 (see FIG. 1).

A flange portion 33 provided on the bearing structure 18 is fastened to the hull 25 with bolts and nuts.

Since the engine 13 is mounted longitudinally with respect to the watercraft body 11, an intake passage 35 is disposed on the left side (one side) of the plurality of cylinders 28 and an exhaust passage 36 is disposed on the right side (the other side) of the cylinders 28.

The intake passage 35 constitutes e.g. an intake manifold and the exhaust passage 36 constitutes e.g. an exhaust manifold.

The intake passage 35 is a member constituting part of the intake structure 20 that communicates with the cylinders 28.

The exhaust passage 36 is a member constituting part of the exhaust structure 21 that communicates with the cylinders 28.

The air intake structure 20 includes an air cleaner 41, a turbocharger (supercharger) 42, an inter-cooler 43, a distribution passage 44 and the intake passage 35.

The air cleaner 41 communicates with the turbocharger 42 via an air introduction pipe 46. The turbocharger 42 communicates with the inter-cooler 43, which in turn communicates with the distribution passage 44 via a distribution passage communicating portion 48. The distribution passage 44 communicates with an intake port of the intake passage 35.

The exhaust structure 21 includes an exhaust passage 36, a first exhaust pipe 51, a second exhaust pipe 52, an exhaust body 53, a water muffler 54 and an exhaust hose 55.

The first pipe 51 is provided to extend from the rear end portion of the exhaust passage 36 toward the rearward of the watercraft body. The rear end portion 51a of the first exhaust pipe 51 communicates with a second exhaust pipe 52 and with the turbocharger 42.

The second exhaust pipe 52 communicates with the exhaust body 53, which communicates with the water muffler 54. The water muffler 54 communicates with the exhaust hose 55, with a discharge port 55a that faces the inside of the pump chamber 14 (see FIG. 1).

The marine drive shaft-bearing structure 18 according to the present invention is below described in detail with reference to FIGS. 3 to 7.

Figure 3:
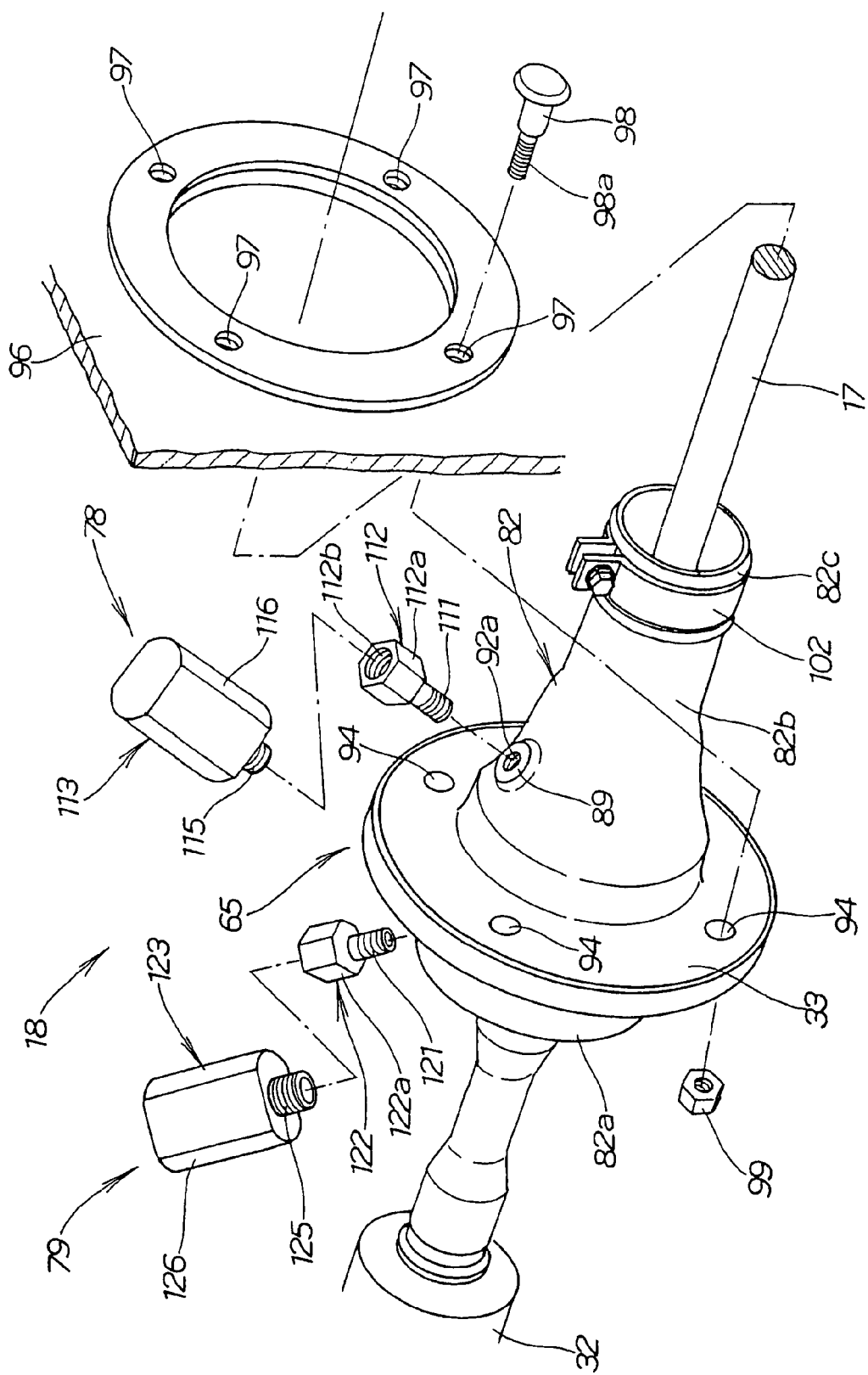
FIG. 3 is a perspective view of the marine drive shaft-bearing structure according to the first embodiment.
Figure 4:
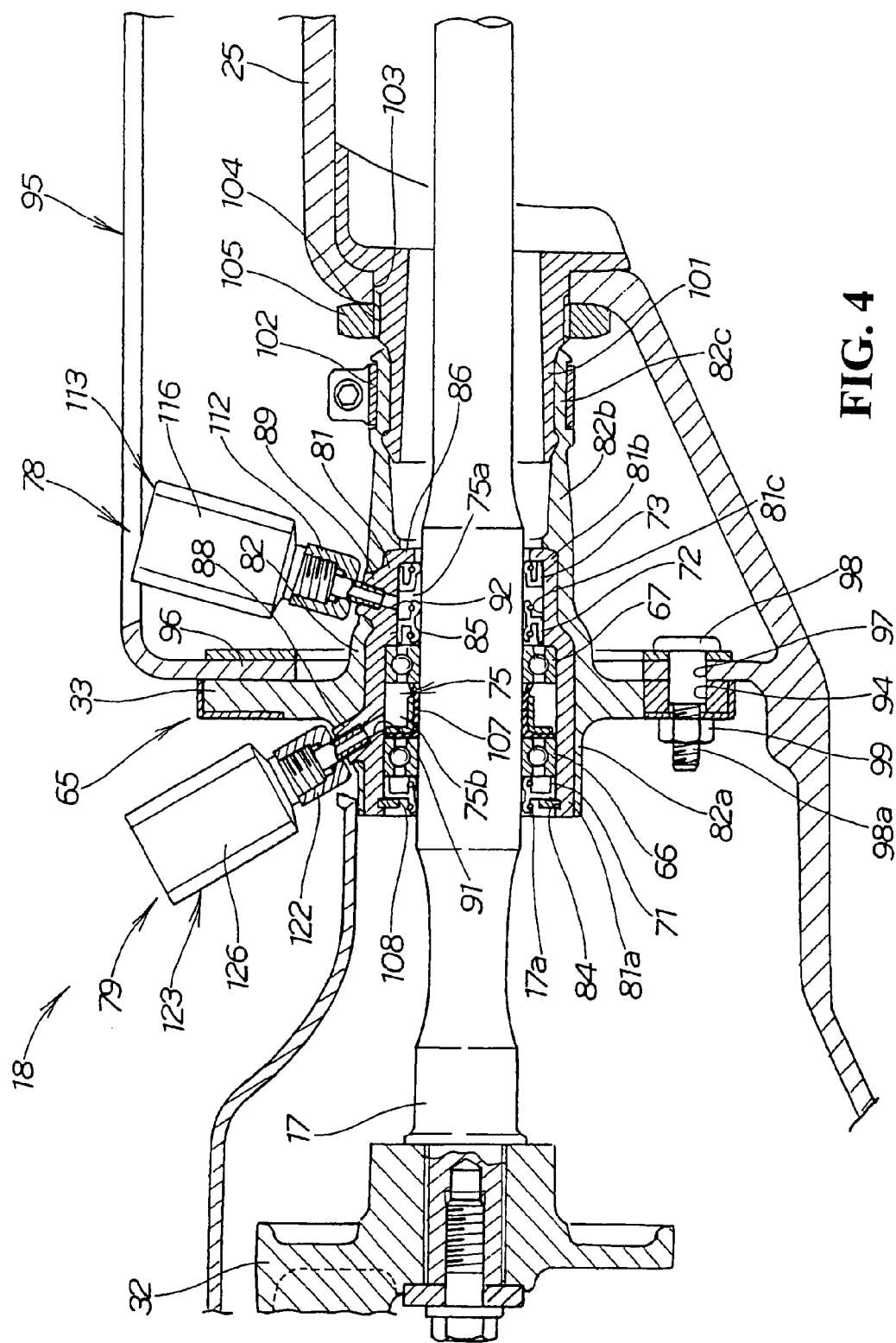
FIG. 4 is a cross-sectional view of the marine drive shaft-bearing structure according to the first embodiment.

FIG. 3 is a perspective view illustrating the marine drive shaft-bearing structure and FIG. 4 is a cross-sectional view illustrating the marine drive shaft-bearing structure according to the first embodiment.

The marine drive shaft-bearing structure 18 includes a bearing body 65 mounted between the engine 13 and the propulsion impeller 27 shown in FIG. 1. A bearing chamber 75 in the bearing body 65 receives therein front and rear bearing members (ball bearings) 66, 67. The front and rear bearing members 66, 67 rotatably carry the drive shaft 17 which connects the engine 13 with the impeller 27 (see FIG. 1). The bearing structure 18 includes a grease filling portion 78 for filling grease 76 (see FIG. 5) in the bearing chamber 75 and a breather portion 79 adapted to absorb thermal expansion within the bearing chamber 75.

The bearing body 65 includes an inner cylindrical body 81, an outer cylindrical body 82 formed integrally with the outer circumference of the inner cylindrical body 81, and a flange portion 33 that is provided on the outer circumference of the outer cylindrical body 82.

The inner cylindrical body 81 is a steel-made member formed with an annular groove 84 in the inner circumference of its front end portion 81a, with a stepped portion 85 at its central portion and with an inner flange 86 at its rear end portion 81b.

The inner cylindrical body 81 is formed with front and rear bosses 88, 89 on the upper portion of its circumferential wall. The front boss 88 is formed with a breather port 91 and the rear boss 89 is formed with a grease filling port 92.

The breather port 91 is inclined to provide a rising gradient extending from the approximate center of the inner cylindrical body 81 toward the front end portion 81a. The breather port 91 is formed with a threaded portion 91a (see FIG. 5) at its upper half.

The grease filling port 92 is inclined to provide a rising gradient extending from the approximate center of the inner cylindrical body 81 toward the rear end portion 81b. The grease filling port 92 is formed with a threaded portion 92a (see FIG. 5) at its upper half.

A front bearing member 66 is provided at the front end portion 81a of the inner cylindrical body 81 and a rear bearing member 67 is provided at the stepped portion 85 of the inner cylindrical body 81. The drive shaft 17 coaxially passes through the inside of the inner cylindrical body 81.

The drive shaft 17 is rotatably supported by the front and rear bearing members 66, 67, which are received in the bearing chamber 75.

A front seal member (seal member) 71 is provided at the front end portion 81a of the inner cylindrical body 81. First and second rear seal members (seal members) 72, 73 are provided at the rear end portion 81b of the inner cylindrical body 81.

The front seal member 71 seals between the drive shaft 17 and the bearing body 65.

The first and second rear seal members 72, 73 seal between the drive shaft 17 and the bearing body 65.

In this way, the bearing chamber 75 is defined by the front seal member 71, the rear bearing member 67, the inner circumferential surface 81c of the inner cylinder body 81, and the outer circumferential surface 17a of the drive shaft 17.

The bearing chamber 75 is filled with the grease 76.

The grease filling port 92 faces a grease chamber 75a between the first and second rear seal members 72, 73. The grease chamber 75a is a space that forms part of the bearing chamber 75.

A connection member 107 is provided between the front and rear bearing members 66 and 67. The breather port 91 faces a grease chamber 75b between the front and rear bearing members 66 and 67.

A front seal member 71 is provided in front of the front bearing member 66. A stopper ring 108 is provided in front of the front seal member 71 so as to be fitted into the annular groove 84 of the inner cylindrical body 81.

The outer cylindrical body 82 has a front half 82a formed integrally with the outer circumference of the inner cylindrical body 81 and a rear half 82b extending rearwardly of the inner cylindrical body 81. The flange portion 33 projects from the outer circumference, and at the approximate center, of the front half 82a.

A flange portion 33 is formed with attachment holes 94. The flange portion 33 is brought into contact with the front wall 96 of the bearing cover 95 and the attachment holes 94 of the flange portion 33 are each aligned to a corresponding one of the attachment holes 97 of the front wall 96. Bolts 98 are inserted into the attachment holes 97 of the front wall 96 and the attachment holes 94 of the flange portion 33. Nuts 99 are fastened to threaded portions 98a of the bolts projecting from the attachment holes 94 of the flange portion 33.

Thus, the bearing body 65 is attached to the front wall 96 of the bearing cover 95.

The rear half 82b of the outer cylindrical body 82 is fitted to a joint member 101 at its rear end portion 82c and is fastened to the joint member 101 with a clamp 102.

The joint member 101 extends forwardly from the opening portion 103 of the hull 25. A threaded portion 104 is formed on the outer circumference of the joint member 101. The joint member 101 is attached to the hull 25 by screwing a nut 105 onto the threaded portion 104.

Figure 5:
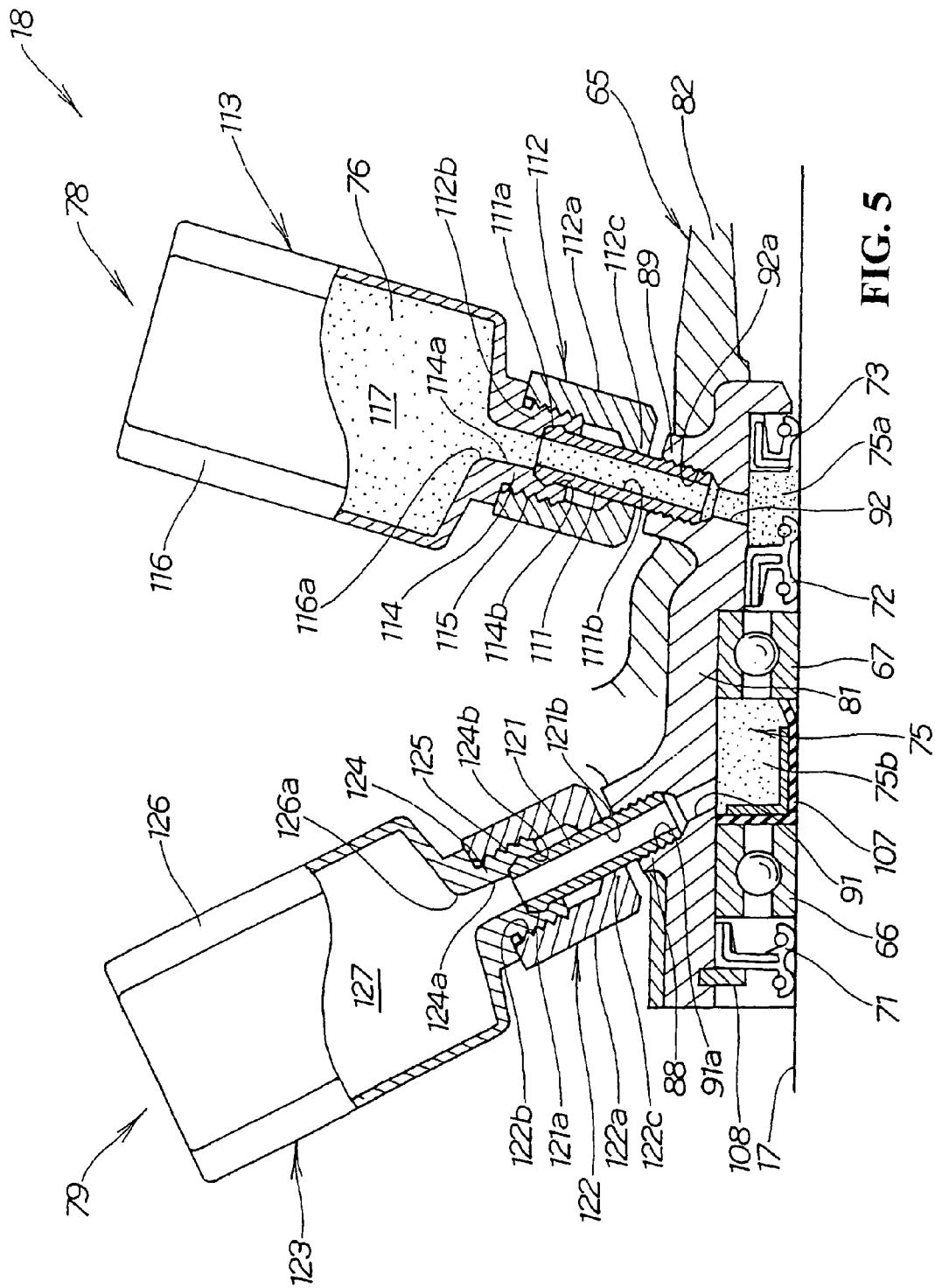
FIG. 5 is a cross-sectional view illustrating a grease filling portion and a breather portion of the bearing structure according to the first embodiment.

FIG. 5 is a cross-sectional view illustrating the grease filling portion and breather portion of the bearing structure according to the first embodiment.

The grease filling portion 78 includes the grease filling port 92 formed in the inner cylindrical body 81 of the bearing body 65 that is in communication with the bearing chamber 75. A connection tube 111 is detachably, threadedly connected to the threaded portion 92a of the grease filling port 92 with a connection-threaded portion 112 fastened to the connection tube 111. A grease tank (grease cartridge) 113 is detachably, threadedly connected to the connection-threaded portion 112.

The connection-threaded portion 112 has an outer circumference 112a formed in a hexagonal shape (see FIG. 3), a threaded hole 112b formed internally, and a bottom portion 112c fixed to the connection tube 111. The threaded hole 112b opens upwardly. The threaded portion 115 of the grease tank 113 is detachably, threadedly connected to the threaded hole 112b.

The grease tank 113 is a member made of an elastic material such as resin and includes a tank body 116 formed with a space 117 adapted to store the grease 76 therein and a grease takeout portion 114 provided at the opening portion 116a of the tank body 116.

The tank body 116 is formed elastically deformable to deflate according to the reduction of the grease 76 stored in the space 117.

More specifically, the grease tank 113 can be simply configured to include only the tank body 116 and the grease takeout portion 114.

The grease takeout portion 114 includes a threaded portion 115 formed on the outer circumferential thereof, a through-hole 114a formed at the center thereof and an enlarged-diameter portion 114b formed at the leading end of the through-hole 114a.

The threaded portion 115 is formed to be threadedly connected to the threaded hole 112b of the connection-threaded portion 112.

The through-hole 114a communicates with the opening portion 116a of the tank body 116.

The enlarged-diameter portion 114b is fitted to an upper end portion 111a of the connection tube 111. In addition, the upper end portion 111a of the connection tube 111 has an outer circumference with an enlarged diameter.

The threaded portion 115 of the grease takeout portion 114 is threadedly connected to the threaded hole 112b of the connection-treaded portion 112, whereby the enlarged-diameter portion 114b is fitted to the upper end portion 111a of the connection tube 111. Thus, the through-hole 114a can be reliably sealed at the upper end portion 111a.

As described above, since the threaded portion 115 of the grease takeout portion 114 is threadedly connected to the threaded hole 112b of the connection-threaded hole 112, the grease tank 113 can be attached to the connection-threaded portion 112 with the through-hole 114a facing downward.

In this state, the space 117 of the tank body 116 communicates with the grease chamber 75a of the bearing chamber 75 through the through-hole 114a, a filling passage 111b of the connection tube 111 and the grease filling port 92.

In addition, the through-hole 114a, the filling passage 111b, the grease filling port 92 and the grease chamber 75a are sequentially arranged from upside to downside.

As described above, the grease filling portion 78 can be simply configured such that the grease tank 113 is only attached to the grease filling port 92.

This can reduce the number of component parts and further make it possible to use the simply configured grease tank 113, thereby reducing the cost of the grease filling portion 78.

The breather portion 79 includes a breather port 91 formed in the bearing body 65 to communicate with the bearing chamber 75 with a connection tube 121 that is detachably, threadedly connected to the threaded portion 91a of the breather port 91. A connection-threaded portion 122 is fixed to the connection tube 121 with a breather tank (breather cartridge) 123 detachably, threadedly connected to the connection-threaded portion 122.

The connection-threaded portion 122 has an outer circumference 122a formed in a hexagonal shape, a threaded hole 122b is formed internally, and a bottom portion 122c is fixed to the connection tube 121.

The threaded hole 122b opens upwardly with the threaded portion 125 of the breather tank 123 being detachably, threadedly connected to the threaded hole 122b.

The breather tank 123 is a member made of an elastic material such as a resin and includes a tank body 126 formed with a space 127 adapted to receive the grease 76 and air therein. A grease receiving portion 124 is provided at an opening portion 126a of the tank body 126.

More specifically, the breather tank 123 can be simply configured to include only the tank body 126 and the grease receiving portion 124.

The grease receiving portion 124 includes a threaded portion 125 formed on the outer circumference thereof with a through-hole 124a at the center thereof, and an enlarged-diameter portion 124b at the leading end of the through-hole 124a.

The threaded portion 125 is formed to be threadedly connected to the threaded hole 122b of the connection-threaded portion 122.

The through-hole 124a communicates with the opening portion 126a of the tank body 126.

The enlarged-diameter portion 124b is fitted to an upper end portion 121a of the connection tube 121. In addition, the upper end portion 121a of the connection tube 121 has an outer circumference with an enlarged-diameter.

The threaded portion 125 of the grease receiving portion 124 is threadedly connected to the threaded hole 122b of the connection-threaded portion 122, whereby the enlarged-diameter portion 124b is fitted to the upper end portion 121a of the connection tube 121. The enlarged diameter portion 124b (through-hole 124a) can be reliably sealed at the upper end portion 121a.

As described above, since the threaded portion 125 of the grease receiving portion 124 is threadedly connected to the threaded hole 122b of the connection-threaded portion 122, the breather tank 123 can be attached to the connection-threaded portion 122 with the through-hole 124a facing downwardly.

In this state, the space 127 of the tank body 126 communicates with the grease chamber 75b of the bearing chamber 75 through the through-hole 124a, the breather passage 121b of the connection tube 121 and the breather port 91.

In addition, the through-hole 124a, the breather passage 121b and the grease chamber 75b are sequentially arranged from upside to downside.

As described above, the breather portion 79 can be simply configured such that the breather tank 123 is only attached to the breather port 91.

This can reduce the number of component parts and further make it possible to use the simply configured breather tank 123, thereby reducing the cost of the breather filling portion 79.

The function of the marine drive shaft-bearing structure 18 is described with reference to FIGS. 6(a) and 6(b) that illustrate the functions of the breather portion and the grease filling portion, respectively, according to the first embodiment.

The function of the breather portion 79 is first described.

Figure 6A:
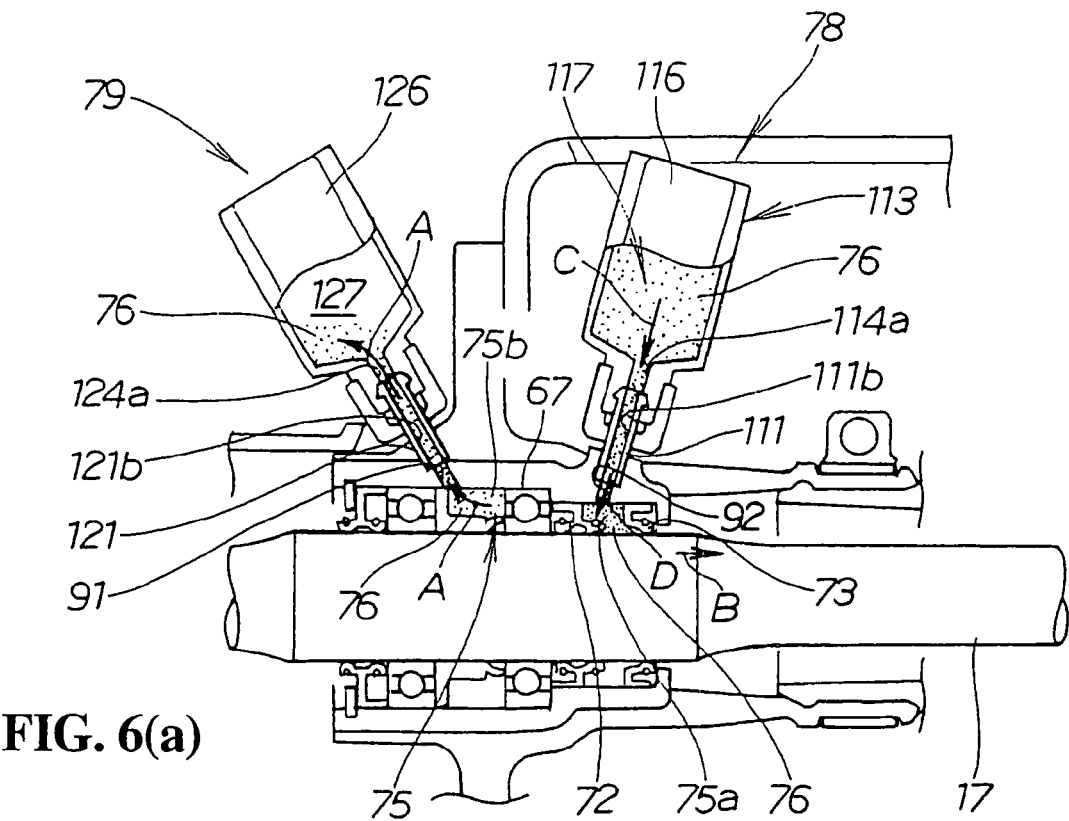
FIGS. 6(a) and 6(b) illustrate the function of the breather portion and grease filling portion of the bearing structure according to the first embodiment.
Figure 6B:
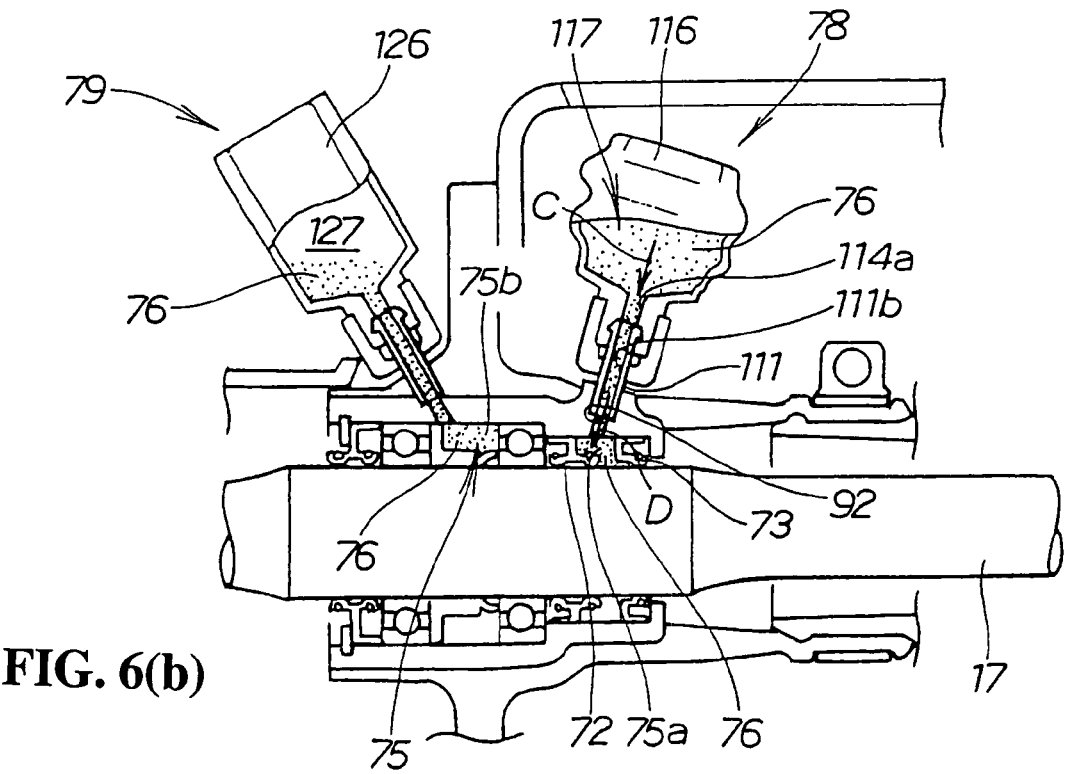

In FIG. 6(a), the bearing chamber 75 is filled with the grease 76. In this state, when the personal watercraft 10 is in operation, the drive shaft 17 is rotated by the engine 13.

This makes it probable that the temperature in the bearing chamber 75 rises to expand the grease 76 or air in the bearing chamber 75.

In this case, the expanded grease 76 and air can be released to the space 127 of the breather portion 79 through the grease chamber 75b of the bearing chamber 75, the breather port 91, the breather passage 121b of the connection tube 121 and the through-hole 124a, as indicated with arrow A.

In addition, it is possible to make the tank body 126 elastically deformable in such a manner as to deflate according to the increase and decrease of the grease 76 or air in the space 127. In this case, if there is no grease 76 and air in the space 127 of the tank body 126, that is, if the tank body 126 is empty, the tank main body 126 keeps a state deflated to some extent.

When the expanded grease 76 or air is released from the bearing chamber 75 to the space 127 of the tank body 126, the tank body 126 is inflated and therefore the grease 76 or air can be further released satisfactorily to the tank body 126.

The function of the grease filling portion 78 is next described.

The engine 13 of the personal watercraft 10 shown in FIG. 1 is driven to rotate the drive shaft 17. This makes it probable that the temperature in the grease chamber 75*a* rises to expand the grease 76 or air in the grease chamber 75*a*.

When the inner pressure of the grease chamber 75*a* is higher than a predetermined pressure, the grease 76 or air in the grease chamber 75*a* moves from near the second rear seal member 73 toward the outside as indicated with arrow B.

In this state, when the operation of the personal watercraft 10 is stopped, the temperature in the grease chamber 75*a* drops to cause the inner pressure of the grease chamber 75*a* to be negative.

Consequently, the grease 76 stored in the space 117 of the grease tank 113 is sucked into the grease chamber 75*a* as indicated with arrows C and D.

Thus, the grease 76 can be filled (replenished) in the bearing chamber 75 without use of a grease gun.

In FIG. 6(*b*), the tank body 116 is formed elastically deformable to deflate according to the reduction of the grease 76 stored in the space 117.

Consequently, when the grease 76 in the space 117 reduces, the tank body 116 deflates while following the reduction of the grease 76.

Thus, the grease 76 in the space 117 can be smoothly drawn into the grease chamber 75*a*.

An example of replacing the grease tank 113 of the marine drive shaft-bearing structure 18 is next described with reference to FIGS. 7(*a*) and 7(*b*) that illustrate an example of replacing the grease tank of the bearing structure according to the first embodiment.

Figure 7A:
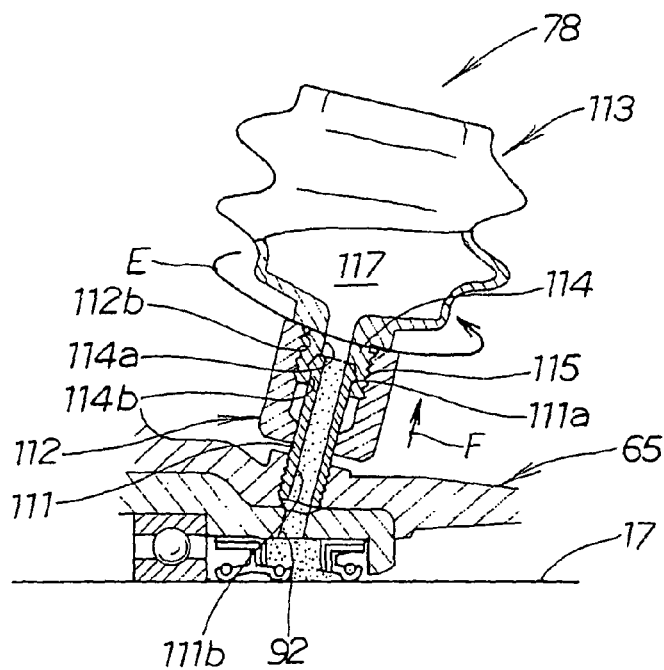
FIGS. 7(a) and 7(b) are views for assistance in explaining an example of replacing a grease tank of the bearing structure according to the first embodiment.
Figure 7B:
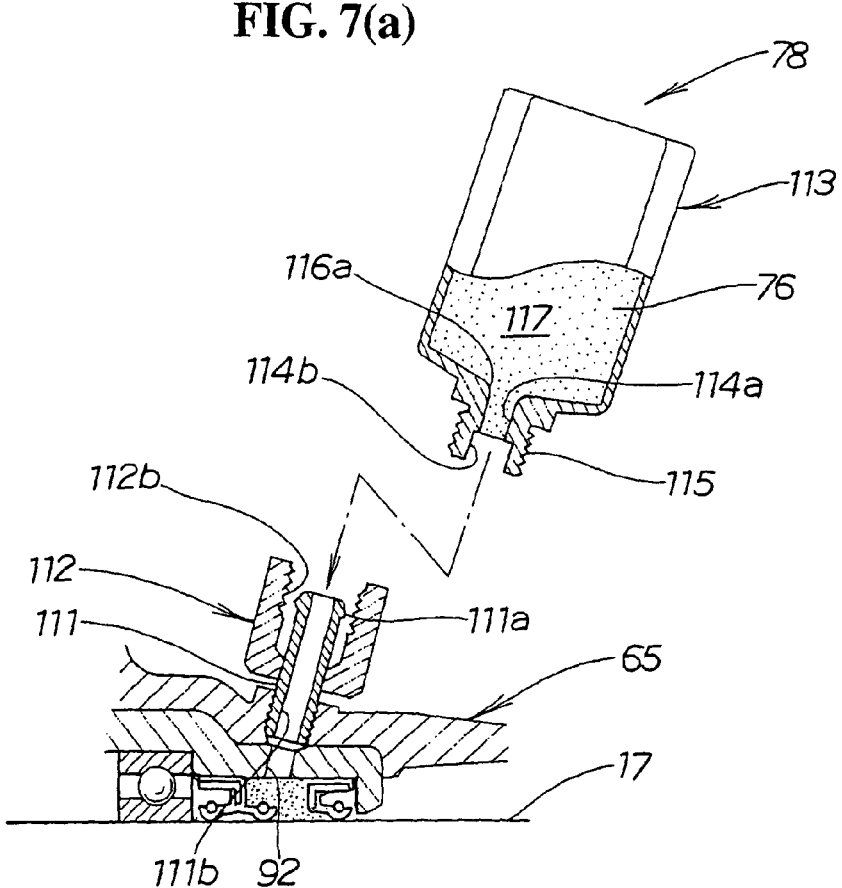

In FIG. 7(*a*), when the grease 76 stored in the space 117 of the grease tank 113 is used up, the grease tank 113 is gripped with an individual's fingers and the threaded portion 115 of the grease tank 113 is turned counterclockwise as indicated with arrow E.

The threaded portion 115 is disengaged from the threaded hole 112*b* of the connection-threaded portion 112.

When the threaded portion 115 is disengaged from the threaded hole 112*b* of the connection-threaded portion 112*b*, the threaded portion 115 rises as indicated with arrow F. Consequently, the enlarged-diameter portion 114*b* (the through-hole 114*a*) of the grease takeout portion 114 is disengaged from the upper end portion 111*a* of the connection tube 111.

Thus, the grease tank 113 can be easily disengaged from the grease filling port 92.

In FIG. 6(*b*), the threaded portion 115 of a new grease tank 113 is inserted into the threaded hole 112*b* of the connection-threaded portion 112. In this state, the threaded portion 115 is turned clockwise.

The threaded portion 115 is then threadedly connected to the threaded hole 112*b*.

When threadedly connected to the threaded hole 112*b*, the threaded portion 115 moves downward. Consequently, the enlarged-diameter portion 114*b* (the through-hole 114*a*) of the grease takeout portion 114 is fitted to the upper end portion 111*a* of the connection tube 111 to provide the state shown in FIG. 5.

Thus, the grease tank 113 can be easily attached to the grease filling port 92.

As described above, with the grease filling portion 78, the grease filling port 92 is provided in the bearing body 65. The connection-threaded portion 112 is provided for the grease filling port 92 through the connection tube 111. The threaded portion 115 of the grease tank 113 is threadedly connected to the connection-threaded portion 112. Thus, the grease tank 113 is allowed to communicate with the grease filling port 92.

In addition, the grease 76 stored in the grease tank 113 is filled (replenished) into the bearing chamber 75 through the grease filling port 92.

Accordingly, since it is possible to keep the grease tank 113 attached to the grease filling port 92, the grease is unlikely to adhere to the vicinity of the grease filling port 92.

This eliminates the need to wipe off the grease 76 adhering to the vicinity of the grease filling port 92. Therefore, the grease 76 can be easily filled (replenished) without an effort.

Further, the grease tank 113 can be attached to and detached from the grease filling port 92 by threadedly connecting the threaded portion 115 of the grease tank 113 to the threaded hole 112*b* of the connection-threaded portion 112.

Thus, for instance, when the grease 76 of the grease tank 113 is used up, the grease tank 113 can be easily replaced with a new grease tank containing the grease 76 by removing it from the grease filling port 92.

In addition, when the new grease tank 113 is stored or transported, a cap (not shown) is threadedly connected to the threaded portion 115.

Since the cap is attached to the new grease tank 113, the grease 76 can be prevented from flowing out through the through-hole 114*a* while the new grease tank 113 is stored or transported.

The bearing structure of a second embodiment is next described. Note that the same or similar members in the second embodiment as those in the first embodiment are denoted with like reference numerals and their explanation is omitted.

Figure 8:
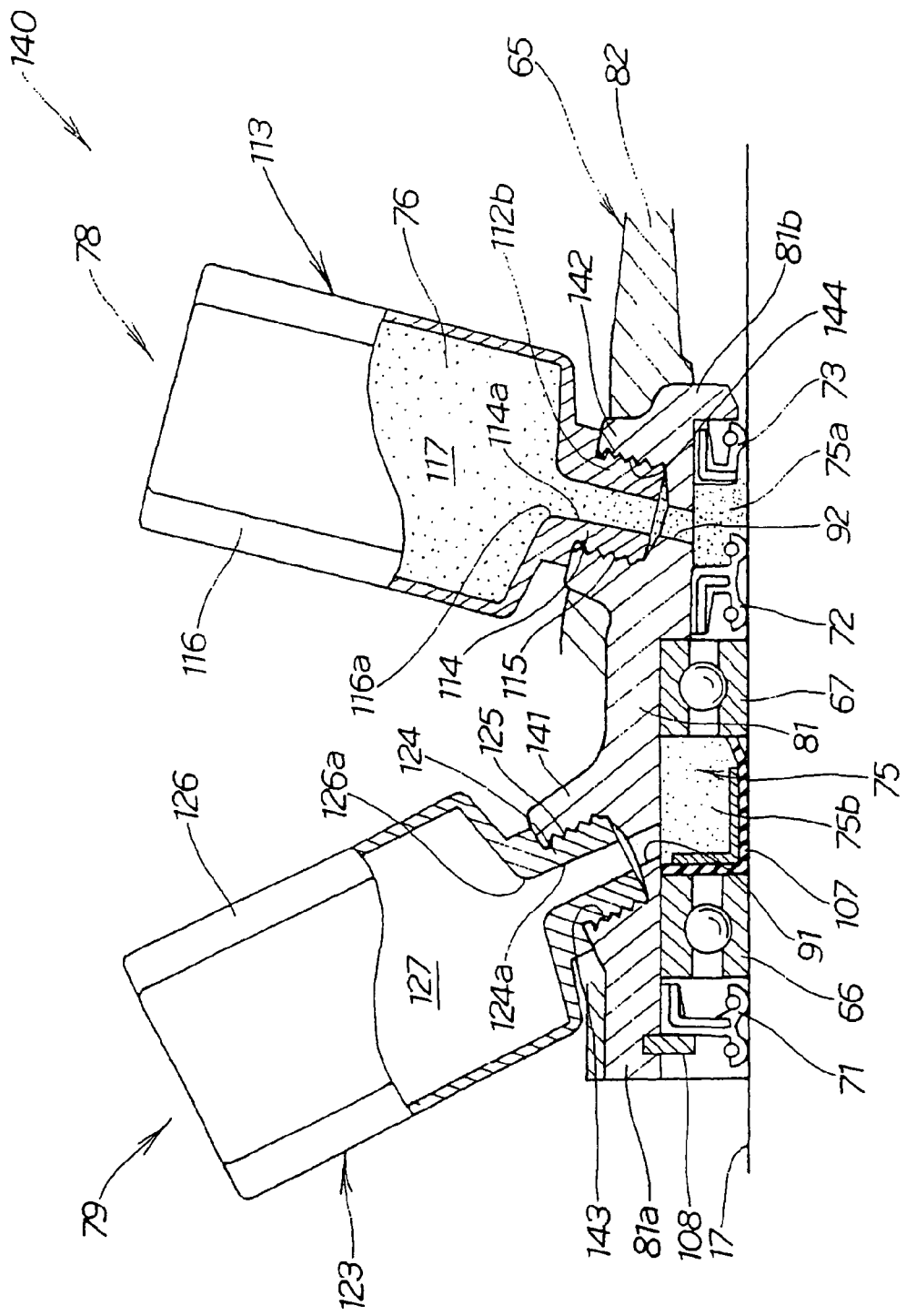
FIG. 8 is a cross-sectional view of the marine drive shaft-bearing structure (a second embodiment) according to the present invention.

FIG. 8 is a cross-sectional view illustrating the marine drive shaft-bearing structure (the second embodiment) according to the present invention.

A bearing structure 140 has the same configuration as that of the bearing structure 18 of the first embodiment except that the connection-threaded portions 112, 121 and the connection tubes 111, 121 are omitted therefrom.

The bearing structure 140 is configured such that the inner cylindrical body 81 is formed with front and rear bosses 141 and 142. The front boss 141 is formed with a breather port 91 and the rear boss 142 is formed with a grease filling port 92.

The breather port 91 is inclined to provide a rising gradient extending from the approximate center of the inner cylindrical body 81 toward the front end portion 81*a*. In addition, the breather port 91 is formed with a threaded portion 144 at its upper half.

A threaded portion 125 of the breather tank 123 is detachably, threadedly connected to the threaded portion 143.

The breather tank 123 is attached to a connection-threaded portion 143 with a through-hole 124*a* facing downwardly.

Thus, the expanded grease 76 or air can be released from a grease chamber 75*b* through the breather port 91 and the through-hole 124*a* to the space 127 of the breather tank 123.

The grease filling port 92 is inclined to provide a rising gradient extending from the approximate center of the inner cylinder body 81 toward the rear end portion 81*b*. In addition, the grease filling port 92 is formed with a threaded portion 144 at its upper half.

A threaded portion 115 of the grease tank 113 is detachably, threadedly connected to the threaded portion 144.

The grease tank 113 is attached to the connection-threaded portion 144 with the through-hole 114*a* facing downwardly.

Thus, the grease 76 stored in the space 117 of the grease tank 113 can be filled (replenished) into the bearing chamber 75 through the through-hole 114a and the grease filling port 92.

The bearing structure 140 of the second embodiment can be simply configured such that the breather tank 123 is only attached to the breather port 91 and the grease tank 113 is only attached to the grease filling port 92.

In addition, as compared with the bearing structure 18 of the first embodiment, the number of component parts can be reduced because of the elimination of the connection-threaded portions 112, 122 and the connection tubes 111, 121.

Further, with the bearing structure 140 of the second embodiment, the grease tank 113 can be attached to and detached from the grease filling port 92 by threadedly connecting the threaded portion 115 of the grease tank 113 to the connection-threaded portion 144.

Thus, the grease tank 113 can be easily replaced.

In short, the bearing structure 140 of the second embodiment can provide the same effect as that of the bearing structure 18 of the first embodiment.

In addition, the exemplified shapes and configurations of the bearing body 65, the front and rear bearing members 66, 67, the front seal member 71, the first and second rear seal members 72, 73, the bearing chamber 75, the grease tank 113 and the breather tank 123 in the embodiments are not restrictive and are modifiable arbitrarily.

The present invention is preferably applicable to a marine drive shaft-bearing structure in which a bearing member is received in a bearing chamber within a bearing body and a grease filling portion is provided to fill grease in the bearing chamber.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A marine drive shaft-bearing structure comprising:
    a bearing body disposed between an engine and an impeller;
    a bearing member received in a bearing chamber within the bearing body for rotatably supporting a drive shaft for connecting the engine with the impeller, a bearing shaft being defined by sealing between the drive shaft and the bearing body; and
    a grease filling portion which is adapted to fill grease into the bearing chamber comprising:
    a grease filling port formed in the bearing body for communication with the bearing chamber;
    a grease tank for storing the grease therein, the grease tank having a neck with a through hole and an outer male threaded portion;
    a connection-threaded portion having an outer circumference formed in a polygonal shape, a female threaded hole which opens upwardly for directly threadedly connecting to the male threaded portion of the grease tank, and a bottom portion with a hole smaller than the female threaded hole;
    a first cylindrically-shaped connection tube having an upper end inserted into the through hole of the neck of the grease tank, a central portion passing through the hole in the bottom portion of the connection-threaded portion, and a lower end detachably, threadedly connected to a threaded portion of the grease filling port, thereby detachably connecting said grease tank to the grease filling port,
    wherein the outer male threaded portion of the neck of the grease tank has a length in an axial direction that is longer than a length of a portion of the first cylindrically-shaped connection tube inserted into the through hole of the neck.

2. The marine drive shaft-bearing structure according to claim 1, wherein when the upper end of the first cylindrically-shaped connection tube is inserted into the through hole of the neck of the grease tank, and
    the female threaded hole of the connection-threaded portion is threadedly connected to the male threaded portion of the grease tank,
    the upper end of the first cylindrically-shaped connection tube is surrounded in a radial direction by the connection-threaded portion.

3. The marine drive shaft-bearing structure according to claim 1, wherein the grease tank is formed of an elastic material so as to deflate according to a reduction of the grease stored in the inside thereof.

4. The marine drive shaft-bearing structure according to claim 1, wherein the bearing body includes an inner cylindrical body and an outer cylindrical body formed integrally with an outer circumference of the inner cylindrical body and a flange portion being provided on an outer circumference of the outer cylindrical body for mounting said bearing body relative to a housing.

5. The marine drive shaft-bearing structure according to claim 4, wherein the inner cylindrical body is formed with front and rear bosses on an upper portion of a circumferential wall wherein the front boss is formed with a breather port and the rear boss is formed with the grease filling port.

6. The marine drive shaft-bearing structure according to claim 5, wherein the breather port is inclined for providing a rising gradient extending upwardly from the inner cylindrical body and said breather port including a female threaded portion for operatively connecting a breather container to the breather port.

7. The marine drive shaft-bearing structure according to claim 5, wherein the grease filling port is inclined for providing a rising gradient extending upwardly from the inner cylindrical body and the threaded portion of said grease filling port for operatively connecting the grease tank to the grease filling port.

8. The marine drive shaft-bearing structure according to claim 5, and further including a second cylindrically-shaped connection tube for operatively connecting a breather container to the breather port,
    wherein an upper end of the second cylindrically-shaped connection tube is fitted into a through hole of the breather container, a central portion of the second cylindrically-shaped connection tube passes through a hole in a bottom of a second connection-threaded portion, and a lower end of the second cylindrically-shaped connection tube includes a male threaded portion connected to a female threaded portion of the breather port.

9. The marine drive shaft-bearing structure according to claim 1, and further including a front seal member operatively positioned between the bearing body and the drive shaft for forming a seal therebetween.

10. The marine drive shaft-bearing structure according to claim 1, wherein the upper end of the first cylindrically-shaped connection tube inserted into the through hole of the neck has a diameter that is larger than that of the central portion, and the lower end of the first cylindrically-shaped connection tube detachably, threadedly connected to the threaded portion of the grease filling port is located outside of the connection-threaded portion.

11. A drive shaft-bearing structure comprising:
a bearing body disposed between an engine and an drive shaft;
a bearing member received in a bearing chamber within the bearing body for rotatably supporting the drive shaft, a bearing shaft being sealed defined by sealing between the drive shaft and the bearing body; and
a grease filling portion adapted for filling grease into the bearing chamber comprising:
a grease filling port formed in the bearing body for communication with the bearing chamber;
a grease tank for storing the grease therein, the grease tank having a neck with an inner hole and an outer male threaded portion;
a connection-threaded portion having an outer circumference formed in a hexagonal shape, a female threaded hole which opens upwardly for detachably, threadedly connecting to the male threaded portion of the grease tank, and a bottom portion with a hole smaller than the female threaded hole;
a first cylindrically-shaped connection tube having an upper end inserted into the inner hole of the neck of the grease tank, a central portion passing through the hole in the bottom portion of the connection-threaded portion, and a lower end detachably, threadedly connected to a threaded portion of the grease filling port, thereby detachably connecting said grease tank to the grease filling port,
wherein the outer male threaded portion of the neck of the grease tank has a length in an axial direction that is longer than a length of a portion of the first cylindrically-shaped connection tube inserted into the through hole of the neck.

12. The drive shaft-bearing structure according to claim 11, wherein when the upper end of the first cylindrically-shaped connection tube is inserted into the through hole of the neck of the grease tank, and
the female threaded hole of the connection-threaded portion is threadedly connected to the male threaded portion of the grease tank,
the upper end of the first cylindrically-shaped connection tube is surrounded in a radial direction by the connection-threaded portion.

13. The drive shaft-bearing structure according to claim 11, wherein the grease tank is formed of an elastic material so as to deflate according to a reduction of the grease stored in the inside thereof.

14. The drive shaft-bearing structure according to claim 11, wherein the bearing body includes an inner cylindrical body and an outer cylindrical body formed integrally with an outer circumference of the inner cylindrical body and a flange portion being provided on an outer circumference of the outer cylindrical body for mounting said bearing body relative to a housing.

15. The drive shaft-bearing structure according to claim 14, wherein the inner cylindrical body is formed with front and rear bosses on an upper portion of a circumferential wall wherein the front boss is formed with a breather port and the rear boss is formed with the grease filling port.

16. The drive shaft-bearing structure according to claim 15, wherein the breather port is inclined for providing a rising gradient extending upwardly from the inner cylindrical body and said breather port including a female threaded portion for operatively connecting a breather container to the breather port.

17. The drive shaft-bearing structure according to claim 15, wherein the grease filling port is inclined for providing a rising gradient extending upwardly from the inner cylindrical body and the threaded portion of said grease filling port for operatively connecting the grease tank to the grease filling port.

18. The drive shaft-bearing structure according to claim 15, and further including
a second cylindrically-shaped connection tube for operatively connecting a breather container to the breather port,
wherein an upper end of the second cylindrically-shaped connection tube is fitted into a through hole of the breather container, a central portion of the second cylindrically-shaped connection tube passes through a hole in a bottom of a second connection-threaded portion, and a lower end of the second cylindrically-shaped connection tube includes a male threaded portion connected to a female threaded portion of the breather port.

19. The drive shaft-bearing structure according to claim 11, and further including a front seal member operatively positioned between the bearing body and the drive shaft for forming a seal therebetween.

20. The drive shaft-bearing structure according to claim 11, wherein the upper end of the first cylindrically-shaped connection tube inserted into the through hole of the neck has a diameter that is larger than that of the central portion, and
the lower end of the first cylindrically-shaped connection tube detachably, threadedly connected to the threaded portion of the grease filling port is located outside of the connection-threaded portion.

* * * * *